Feb. 14, 1956     W. L. MORRISON     2,734,313
METHOD OF AGRICULTURAL CULTIVATION
Filed May 16, 1952
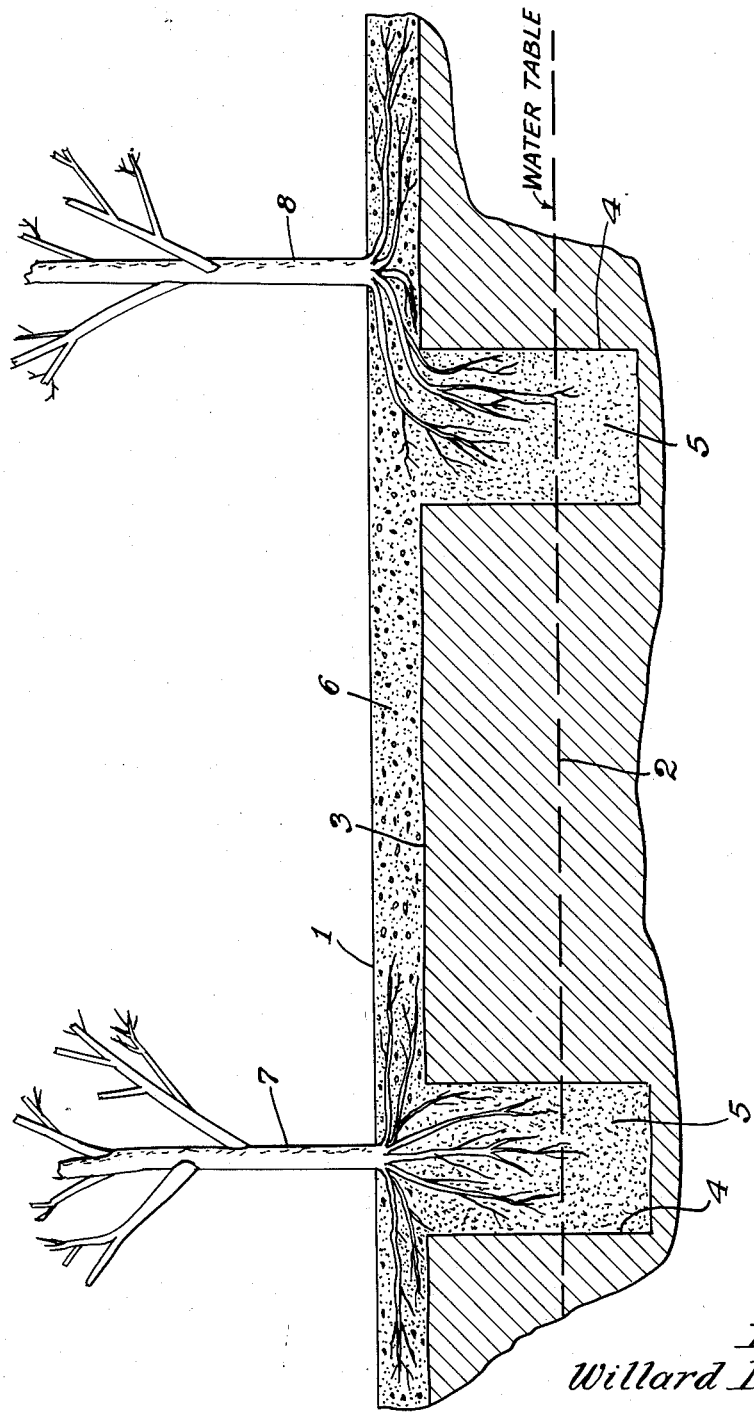
Inventor
Willard L. Morrison

2,734,313

METHOD OF AGRICULTURAL CULTIVATION

Willard L. Morrison, Lake Forest, Ill., assignor to Union Stock Yards & Transit Company of Chicago, Chicago, Ill., a corporation of Illinois Application May 16, 1952, Serial No. 288,215

2 Claims. (Cl. 47—58)

My invention relates to improvements in method of promoting vegetable growth and has for one object to provide a method whereby crops may be grown in places and under circumstances where, without special treatment, vegetation will not thrive.

My invention is especially well adapted to cultivation of trees and bushes without mechanical irrigation where the water suppy and the soil itself are inadequate to support vegetable growth, though the method is also adaptable for supporting any type of vegetable growth.

My invention is applicable to those places where the underlying strata are largely the product of coral growth and include a porous, friable, calcareous layer or include a layer of hard clay or other pulverized material, inadequate without treatment to support satisfactory crops.

Under these circumstances, it frequently happens that the water table is several feet below ground level and in the past it has been necessary to sink wells below the water table and pump water up for irrigation. Such ground structure may ultimately, after many years, break down into a soil but such soil, without the addition of plant nutritive material supports little if any vegetation and must be irrigated.

I have found that such a soil may be conditioned to support vegetation if in the first place the upper surface is broken up or pulverized, for instance, by use of one of the well known plows, such as the Rototiller. Such broken up or pulverized calcareous or sand-like material is porous, permits access of air to the plant roots but does not in itself contain the elements required for plant growth. I propose, therefore, to mix such broken rock or soil with a substantial amount of composted animal manure. This provides the nourishment necessary to support plant growth and being mixed with the sand-like, broken material provides a growth supporting bed through which plant roots may penetrate in their search for the food values in the resultant soil and also aids in preventing later compacting of the treated soil.

In addition to this, I propose to sink at spaced, fairly close intervals, small wells extending down below the lowest water table level. These wells will be filled with composted animal manure or with a mixture of composted animal manure and the broken or pulverizd material. Since the lower end of the well will fill with water, being below the water table level, the composted manure remains moist. This composted manure is to a substantial degree hygroscopic and it is porous and acts as a wick to draw up moisture from the water table and raise it to the level of the seed bed above referred to. That being the case, the water will spread by capillary attraction laterally through the bed and the bed will thus have sufficient moisture and sufficient nutritive value to support plant growth.

For example, citrous trees may be planted in such an environment and since there is moisture in the bed, the trees will survive and grow with increased root development. The root development will tend to penetrate from the bed into the wick in the well and also will tend to extend downwardly toward the water, perhaps actually into it.

I thus provide access from the bed to the water table. The roots will not appreciably penetrate the calcareous bed and certainly will not do so in their early stages but they will, if the wells are closely enough spaced, be able to reach the water or reach down toward the water so that the wick action of the compost or other fibrous material in the well will insure an adequate supply of moisture for the tree or other plant.

The nutritive values in the compost are extracted by and feed the plant. The time will come when the nutritive values will be exhausted and it will be necessary to add additional amounts of composted manure to the bed. This will ordinarily not be necessary in connection with the wick of composted manure in the well because even though the food values in the wick may be exhausted, the wick still remains porous and furnishes a continuing supply of water. Of course, if desired, the wick itself may be replaced but as a general proposition it will be sufficient to periodically add compost to the bed over the entire surface so that plants will be able to get both moisture and food without the provision of any pumping means to raise the water to the level of the bed and with merely periodic replenishment of the composted manure in the bed.

My invention is illustrated more or less diagrammatically in the accompanying drawing wherein like parts are indicated by like characters throughout the specification and claims.

1 indicates the initial level of the ground or rock layer. It may be coral rock, clay or any other hard, impervious but friable material. 2 is the water table. 3 is the depth to which the upper layer is disturbed and comminuted or pulverized so that the vegetable growth supporting or seed bed extends between the levels 1 and 3, and the bed is a mixture of the comminuted original layer and composted manure. 4, 4 indicate wells sunk below the ground level to a point below the water table. 5 indicates the composted manure or mixture of manure and comminuted rock which forms a wick in the well, which remains in situ and is not disturbed. The seed bed or plant supporting layer 6 is, as above indicated, found between the levels 1 and 3 and is in intimate contact with the wick or manure mass 5 in the wells 4. 7 represents a tree which is planted in the growth bed 6 and its roots spread laterally in the growth bed and also downwardly through the well. A tree 8 planted at one side of the well will have its roots spreading laterally and some of them reaching the well extend down into, toward or perhaps clear into the water table.

I claim:

1. The method of agricultural cultivation which consists in pulverizing the upper portion of a generally solid rock-like soil layer to a depth substantially less than the normal water table, mixing the pulverized material with a hygroscopic growth supporting fertilizer mass to form a vegetable growth supporting layer superimposed on the rock-like layer, sinking a plurality of spaced separate wells through the growth supporting and rock-like layers to the water table, the wells being spaced from each other at a distance relative to the root length of the vegetable growth, filling the wells with a hygroscopic growth supporting fertilizer mass to form a wick in intimate contact with the growth supporting layer and the water table, planting vegetation in the growth layer spaced from each other relatively to the well spacing so that the root growth of the vegetation may spread laterally through the growth layer and also penetrate downwardly through the wicks into the wells.

2. The method of claim 1 in which the vegetation is spaced without regard to the well spacing.

(References on following page)

References Cited in the file of this patent

UNITED STATES PATENTS

| | | |
|---|---|---|
| 1,171,559 | Taylor | Feb. 15, 1916 |
| 1,251,315 | Wingett | Dec. 25, 1917 |
| 1,306,547 | Lyon | June 10, 1919 |
| 1,638,862 | Lott | Aug. 16, 1927 |

FOREIGN PATENTS

| | | |
|---|---|---|
| 883,262 | France | Mar. 22, 1943 |
| 121,047 | Switzerland | June 16, 1927 |